United States Patent [19]

McQuade

[11] Patent Number: 4,899,176
[45] Date of Patent: Feb. 6, 1990

[54] METHOD OF REDUCING AVERAGE DATA RATE IN ROTATING MIRROR LASER RECORDER

[75] Inventor: John M. McQuade, St. Paul, Minn.

[73] Assignee: Minnesota Mining and Manufacturing Company, St. Paul, Minn.

[21] Appl. No.: 236,463

[22] Filed: Aug. 25, 1988

[51] Int. Cl.$^4$ .................. G01D 9/42; G02B 26/08; H04N 1/23

[52] U.S. Cl. ........................ 346/108; 358/302; 358/481; 350/6.7; 346/76 L

[58] Field of Search ............... 358/296, 302, 206, 481; 346/108, 160, 76 L; 350/6.7, 6.8; 355/8; 250/236

[56] References Cited

U.S. PATENT DOCUMENTS

4,583,128 4/1986 Anderson, Jr. et al. ............ 358/302

Primary Examiner—Bruce A. Reynolds
Assistant Examiner—Scott A. Rogers
Attorney, Agent, or Firm—Donald M. Sell; Walter N. Kirn; William D. Bauer

[57] ABSTRACT

A laser printer records an image on a medium as a function of digital data which is received at an input data rate. A laser beam is used for recording pixels of the image on the medium while the medium is advanced in a longitudinal direction at a controlled uniform rate. The pixels are recorded by scanning the beam across the medium in a transverse direction, at a scan velocity, using a multifaceted, rotating mirror which reflects the beam onto the medium. The scan velocity is proportional to the angular velocity of the rotating mirror. Beam intensity is modulated as a function of the input digital data. In order for the average data rate of recording to be compatible with the input data rate while maintaining a high instantaneous scan velocity, the beam is scanned across the medium by only one of every N-facets of the rotating mirror.

9 Claims, 6 Drawing Sheets

METHOD OF REDUCING AVERAGE DATA RATE IN ROTATING MIRROR LASER RECORDER

BACKGROUND OF THE INVENTION

1. Field of the Invention

This invention relates to multifaceted mirror laser printing systems. More particularly, this invention relates to reducing the average data rate used in such a system in an uncomplicated and cost effective manner.

2. Description of the Prior Art

The Minnesota Mining & Manufacturing Company P831 Laser Imager, which is described in U.S. Pat. No. 4,583,128, is an example of a polygon based mirror laser printing system. Such systems create a hard copy of an image by exposing a photosensitive medium to a laser beam, the intensity of which is determined by digital data which is input to the printing system from a host device at an input digital data rate. The image is created by exposing the photosensitive medium, in a pixel-by-pixel (point-by-point) manner, to the laser beam which is modulated in intensity according to the input digital data. The input digital data causes the intensity of the beam to be modulated at each pixel (point) as it is scanned across the photosensitive medium in a raster fashion. The photosensitive medium is moved in a longitudinal direction while the beam is being scanned in a transverse direction. Each time the beam is scanned across the medium it produces a scan line. The image to be printed is comprised of multiple (nominally 300) scan lines per inch in the longitudinal direction and multiple (nominally 300) pixels per inch in the transverse direction.

Generally, to achieve the highest quality output imaging, the entire digital image must be printed without stopping. Therefore, it is desirable to transport the photosensitive medium in the longitudinal direction in a smooth, continuous manner rather than in an incremental, step type of manner. With continuous transport, the medium is not stopped once printing has begun. The digital data, therefore, must be supplied to the laser printer by the host device fast enough so that there is no loss of image quality due to loss of synchronization between the input digital data rate from the host device and the data rate requirements of the laser printer. The speed at which the host device must transfer digital data to the printer is determined by the product of the number of pixels per line and the number of lines printed per second.

For a high speed laser printer, it is very common that the necessary output speed exceeds the highest speed at which the host device can transfer digital data to the printer. For example, the P831 Laser Imager requires data to be transferred to the laser at a speed of approximately 2.5 million pixels per second (averaged over one scan line). This value usually exceeds the data transfer capabilities of a host device which typically may be less than 1 million pixels per second. Therefore, a problem which must be addressed is how to match the input data rate requirements of the laser printer with the transfer speed constraints of the host device.

In the past, this problem has been addressed by the inclusion of a mass memory system within, or closely connected to, the laser printer. This memory is loaded with the digital data, representing the entire image to be printed, from the host device before any printing begins. Therefore, no data transfer constraints are placed on the host device. Recent memory technology and design have allowed the digital data stored in the memory to be read out at a rate which matches the data rate requirements of the laser printer. For example, the P831 Laser Imager employs up to 20 megabytes of RAM which are used to temporarily store a page of image data prior to printing.

There are several disadvantages to this approach of matching the data rates. First, the amount of digital data required to represent a complex, high resolution, digital image can be very large and, although magnetic disk memory can sometimes be used as an alternative to integrated circuit memory, very fast access time memory is required. Due to the size and access time required of this memory, it is very costly.

Second, such a system entails a significant duplication of resources. If the host device and the laser printer are viewed as a complete system, the memory which is added to the laser printer may be duplicating a memory which already exists in the host device.

Third, to guarantee high speed operation of such a large semiconductor memory, special techniques are required in implementation. These techniques are very complex and costly.

SUMMARY OF THE INVENTION

This invention is an apparatus and method for recording an image on a medium, as a function of digital data received at an input data rate, which does not require a mass memory to buffer data for an entire image in order to accommodate differences between an average data rate of scanning by the laser printer and an input data rate. Beam producing means produces a beam for recording pixels of the image on the medium. Modulating means is provided for modulating the intensity of the beam as a function of the input digital data. The beam is scanned across the medium in a transverse direction using a scanning means. The scanning means reflects the beam off of a multifaceted rotating mirror, each facet of which is capable of producing one scan of the beam across the medium at a scan velocity which is proportional to the angular velocity of the rotating mirror. Beam controlling means is used for controlling the beam so that the beam is scanned by only one of every N-facets of the multifaceted mirror. Therefore, an average data rate of scanning is achieved which can be varied to be compatible with the input data rate while maintaining the instantaneous scan velocity. A medium transport means is used for advancing the medium in a longitudinal direction at a rate which is controlled according to the average data rate of scanning produced by the beam controlling means.

DETAILED DESCRIPTION OF THE PREFERRED EMBODIMENTS

Figure 1:
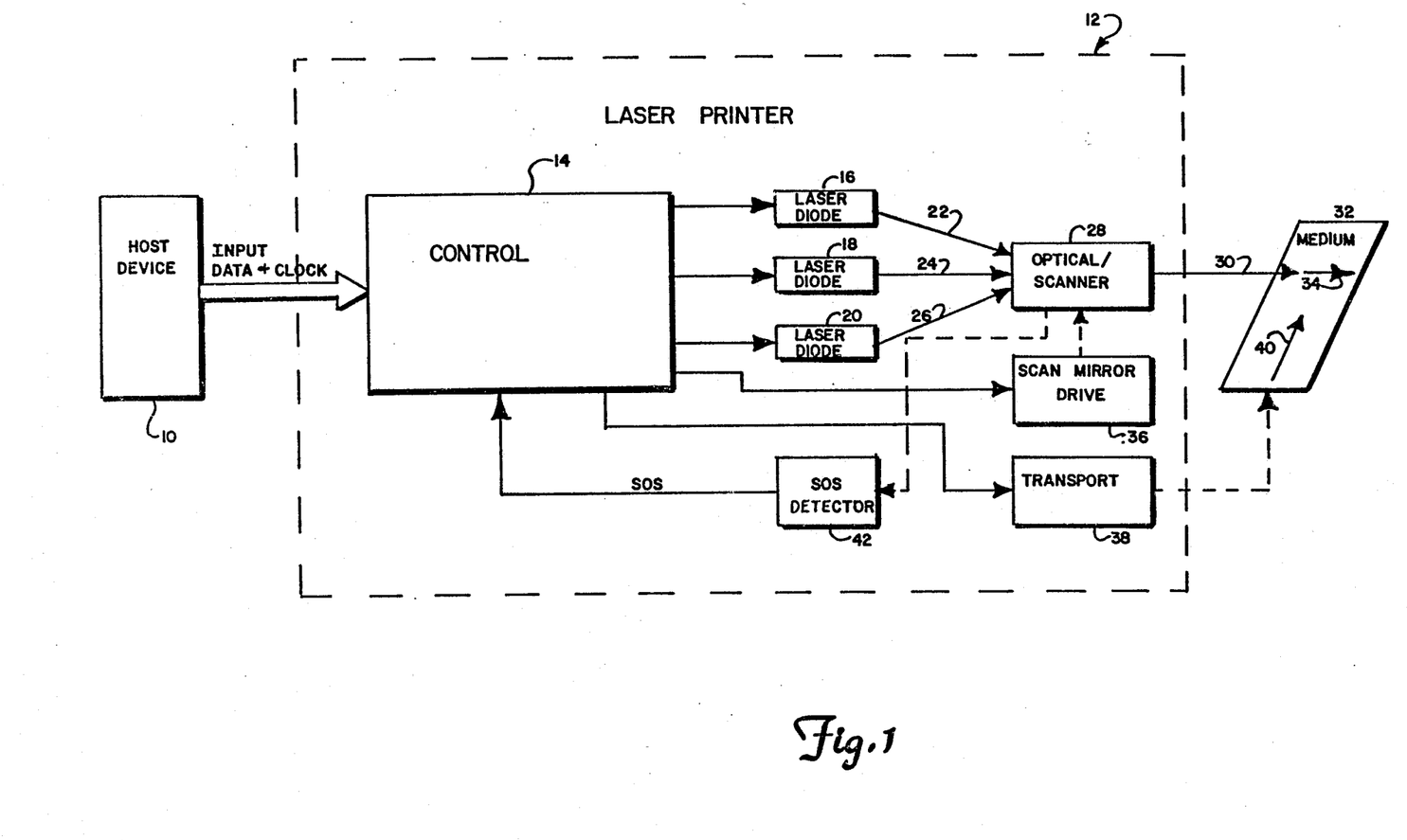
FIG. 1 shows a block diagram of the system in the present invention.

FIG. 1 shows a block diagram of a system which uses the present invention. Host device 10 transfers input data, which represents an image to be printed, to laser printer 12. Control circuit 14 of laser printer 12 receives the input data and uses it to control laser diodes 16, 18 and 20. Laser diodes 16, 18 and 20 emit beams of radiation 22, 24 and 26 of different wavelengths. Control circuit 14 controls laser diodes 16, 18 and 20 such that the intensity of beams 22, 24 and 26 is modulated according to the input data which is received from host 10.

Beams 22, 24 and 26 are combined and collimated in optics/scanner portion 28 of laser printer 12 resulting in combined beam 30. Beam 30 is impinged on photosensitive medium 32 and is scanned by optics/scanner 28 across medium 32 in the transverse direction shown by arrow 34. Control circuit 14 uses the input data from host device 10 to modulate the intensity of beams 22, 24 and 26, which are emitted by laser diodes 16, 18 and 20, in such a way that as beam 30 is scanned across medium 32, the intensity of beam 30 is modulated on a pixel-by-pixel (point-by-point) basis. This results in a series of spots (pixels) along the width of medium 32 in the direction indicated by arrow 34. This series of spots is called a scan line.

The speed at which beam 30 is scanned across medium 32 in the transverse direction indicated by arrow 34 (i.e. the instantaneous scan velocity), is determined by scan mirror drive 36 which is controlled by control circuit 14. As beam 30 is scanned across medium 32, at the instantaneous scan velocity, in the direction shown by arrow 34, transport 38 moves medium 32 in the longitudinal direction indicated by arrow 40, which is perpendicular to the transverse direction indicated by arrow 34. By moving medium 32 in the longitudinal direction indicated by arrow 40 and by scanning beam 30 across medium 32 in the transverse direction indicated by arrow 34, a series of scan lines is accumulated on medium 32 which combine to create the image to be printed which was represented by the input data transferred to laser printer 12 by host device 10.

Start of scan (SOS) detector 42, which will be described in more detail later in the specification, is associated with optics/scanner 28 to produce a start of scan (SOS) signal which indicates that beam 30 is about to begin scanning across medium 32. The SOS signal is used as a feedback signal for timing and synchronization in control circuit 14.

Figures 2, 2A:
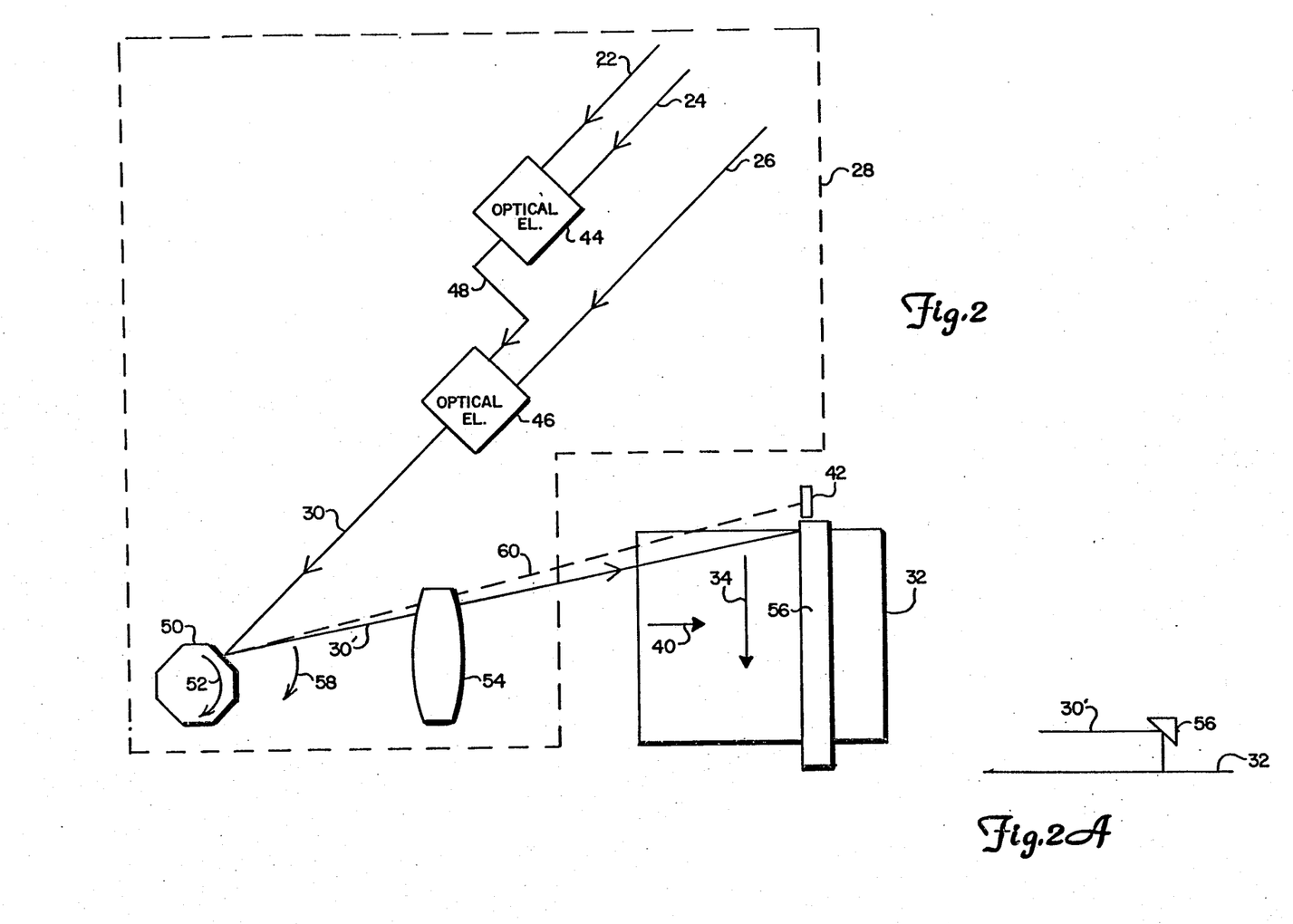
FIG. 2 schematically shows the optics/scanner portion and the start of scan (SOS) detector of the present invention.
FIG. 2A shows the beam impinging on the photosensitive medium.

FIGS. 2 and 2A show a simplified diagram of optic/scanner portion 28 of laser printer 12. This is similar to the assembly shown in U.S. patent application Ser. No. 06/736,252, which is owned by the assignee of the present application and is hereby incorporated by reference. Optical elements 44 and 46 are used to collimate, shape and bring beams 22, 24 and 26 into coincident paths. Optical element 44 combines beams 22 and 24 into a coincident, two-component beam 48, while optical element 46 combines beams 26 and 48 to produce a coincident, three-component beam 30. Beam 30 is directed onto the face of multifaceted, rotating, polygonal mirror 50, which is rotating in the direction indicated by arrow 52. Each facet of rotating mirror 50 is capable of reflecting beam 30 and creating reflected beam 30' which travels through scan linearizing lens 54, described in detail in U.S. patent application Ser. No. 06/736,252, and is focused thereby on medium 32 after being reflected by reflecting element 56. Each facet of rotating mirror 50 effectively sweeps reflected beam 30' in the transverse direction in response to the rotation of rotating mirror 50 as shown by arrow 58.

As each facet of rotating mirror 50 begins to sweep reflected beam 30', beam 30' is directed along the path indicated by dashed line 60 onto SOS detector 42. SOS detector 42, which is preferably a photodetector, then emits the SOS signal, which indicates that a scan line is about to begin. The SOS signal is used in control circuit 14 and will be described in greater detail later.

The sweeping motion caused by beam 30 being reflected off of a facet of rotating mirror 50 produces a circular focal scan which is converted to a linear focal scan by lens 54. This results in a constant linear instantaneous scan velocity in the transverse direction which is observed at reflecting element 56 and, consequently, at medium 32. One sweep of reflected beam 30' across medium 32 corresponds to the rotation of one facet of rotating mirror 50 past beam 30, and results in a single scan line across medium 32.

By transporting a photosensitive medium 32 uniformly in the longitudinal direction indicated by arrow 40, an image can be created on the photosensitive medium 32. Each scan line in the image corresponds to one facet of rotating mirror 50. The velocity at which the photosensitive medium is transported in the longitudinal direction indicated by arrow 40 is controlled and synchronized with the rotational velocity of rotating mirror 50 to produce the desired line density and the resulting image.

It can now be seen that the rate at which data must be supplied, as shown in FIG. 1, by a host device 10 to laser printer 12 is proportional to the scan velocity, the number of pixels per scan, the number of scan lines per second, and the number of scan lines per image.

It is very desirable to operate medium transport 38 in a smooth, continuous fashion rather than in a stepped, incremental fashion. It is also desirable to retain the instantaneous scan velocity at a high rate to eliminate skewing the image to be printed since the photosensitive medium 32 is in constant motion. Thus, it is desirable to keep the angular velocity of rotating mirror 50 high since the scan velocity is directly related to the angular velocity of rotating mirror 50. In addition, the rotation of mirror 50 is generally more stable at higher velocities.

However, as discussed above, host device 10 typically can supply data only at an input data rate which is much lower than the data rate used by the laser printer. Although both the angular velocity of rotating mirror 50 and the transport speed could be reduced to match the input data rate of host device 10, this would require a modification of the characteristics of the photosensitive medium 32 to accomodate the longer exposures which would result from the much lower instantaneous scan velocity.

The present invention maintains the desired high instantaneous scan velocity, while decreasing the required average data rate of transfer from host device 10 to laser printer 12, by decreasing the number of scan lines per second so that the average data rate of recording matches the input data rate from host device 10. This is done by skipping a number of facets on rotating mirror 50 and thereby causing a scan line across photosensitive medium 32 for only one in every N facets (where N is an integer greater than one). This maintains the instantaneous scan velocity (since the angular velocity of rotating mirror 50 is unchanged) while decreasing the required average data rate of transfer from the host device 10 by a factor of N. Upon decreasing the number of scan lines, however, it becomes necessary to decrease the transport rate 38 at which the photosensitive medium transport moves photosensitive medium 32 in the longitudinal direction indicated by arrow 40 so that the scan line density (i.e. number of scans per inch) remains constant. This results in retention of image quality.

Figure 3:
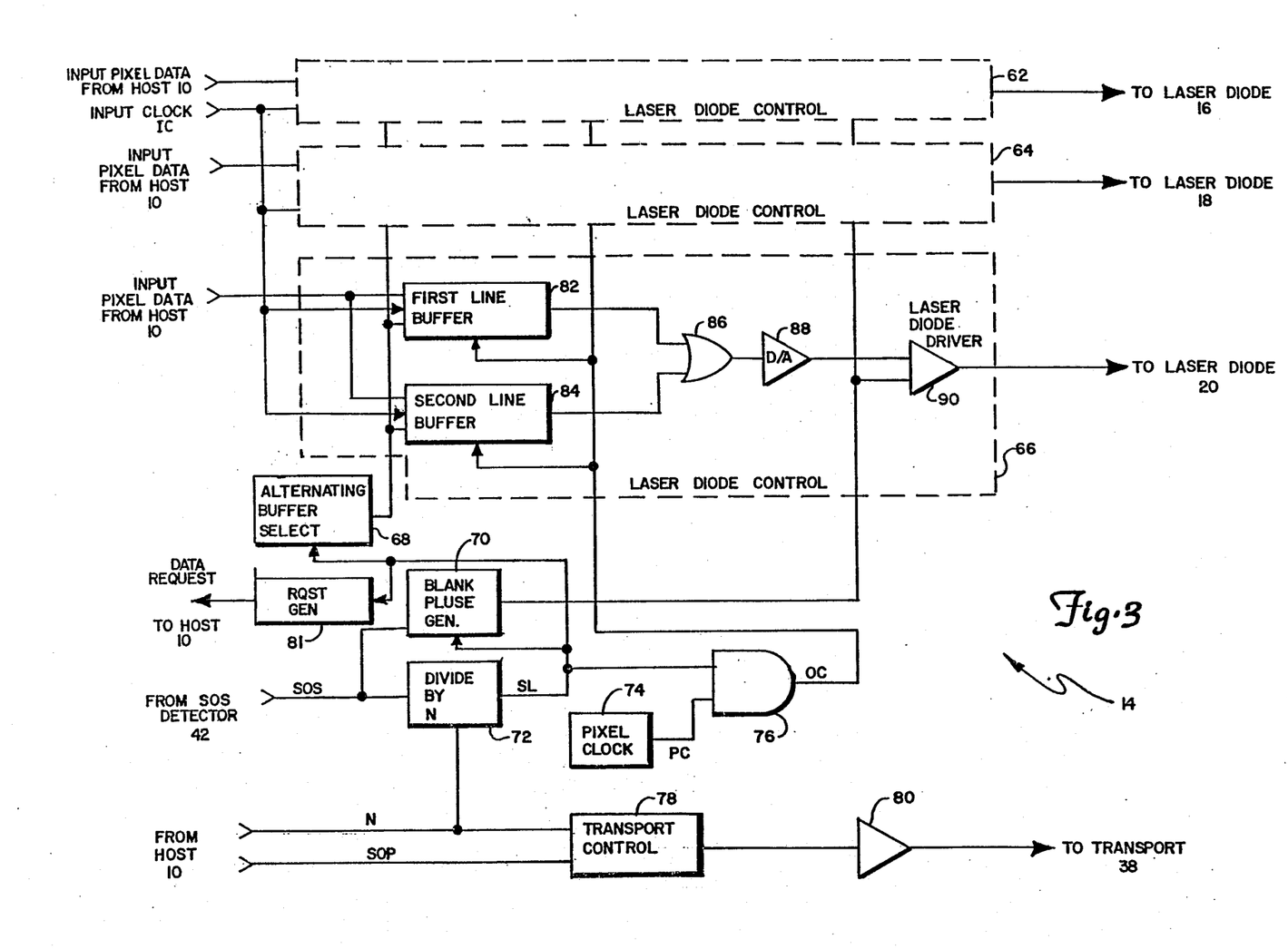
FIG. 3 shows a portion of the control logic used in the laser printer.

The block diagram in FIG. 3 shows one embodiment of control circuit 14 which will cause N facets of rotating mirror 50 to be skipped while maintaining the instantaneous scan velocity. Control circuit 14 also maintains a scan line for one of every N facets and controls the photosensitive medium transport 38 so that the scan line density remains constant.

As shown in FIG. 3, control circuit 14 includes laser diode control circuits 62, 64 and 66, alternating buffer select circuit 68, blank pulse generator 70, divide-by-N counter 72, pixel clock 74, AND gate 76, transport control 78, transport driver 80, and request generator 81. Laser diode control circuits 62, 64 and 66 control laser diodes 16, 18 and 20, respectively, as a function of input pixel data received from host device 10. Circuits 62, 64, and 66 are identical, and only circuit 66 is shown in detail in FIG. 3. Each of the laser diode control circuits 62, 64, and 66 includes first and second line buffers 82 and 84, OR gate 86, digital-to-analog (D/A) converter 88 and laser diode driver 90.

First and second line buffers 82 and 84 operate in a double-buffered arrangement under the control of alternating buffer select circuit 68. One of the buffers 82, 84 receives pixel data from host device 10 for an entire scan line at a rate defined by an input clock (IC) signal, while the other buffer is available to have data for the preceding line read out in response to an output clock (OC) signal through OR gate 86 to D/A converter 88. The digital value for each pixel is converted to an analog signal by D/A converter 88 and is supplied to laser diode driver 90. The magnitude of the analog signal from D/A converter 88 determines the level of drive applied to the laser diode 16, 18, 20, and therefore intensity of the laser beam 22, 24, 26 emitted by that laser diode 16, 18, 20. The intensity of the laser beam 22, 24, 26 determines the level of exposure of the photosensitive layer of medium 32, which is sensitive to the wavelength of that particular beam, and therefore the resulting color density of the pixel recorded as a result of that exposure.

The operation of control circuit 14 is coordinated with host device 10 so that the time required to transfer an entire scan line of pixel data into one of the buffers 82, 84 is less than or equal to the time required to rotate N facets of rotating mirror 50 through the path of beam 30. By using only one of every N facets of mirror 50 to produce a scan line, the average data rate of recording is made compatible with the input data rate from host device 10. Host device 10 supplies, as an input to control circuit 14, the digital value N which determines the average data rate of recording. The value N is supplied to divide-by-N counter 72 to control the number of facets which will be skipped, and to transport control 78 to control the transport speed of medium 32 in the longitudinal direction.

A start of picture signal (SOP) from host device 10 to transport control 78 causes transport 38 to begin to move the photosensitive medium 32 in the longitudinal direction (indicated by arrow 40 in FIG. 2) at a rate which is controlled by N. Each time a facet on rotating mirror 50 reflects beam 30' into start of scan (SOS) detector 42, the SOS signal pulse is generated by SOS detector 42, and is supplied to divide-by-N counter 72. The output of divide-by-N counter 72 is a scan line (SL) signal, which is a pulsed signal which occurs once every N pulses of the SOS signal (i.e. each time a total of N facets of rotating mirror 50 have reflected beam 30' into SOS detector 42). The SL signal signifies the start of each scan line during which pixels of the image are to be recorded, and it controls timing and synchronization of digital data transfer and conversion.

When an SL signal pulse is produced, it disables blank pulse generator 70 which, when enabled, is used to clamp off laser diode driver 90. The SL signal pulse is also applied to alternating buffer select 68 which prepares first or second line buffer 82 or 84 (whichever contains the pixel data for the scan line to be printed) to be read from and prepares the other to be written to. Also, the SL signal is applied to request generator 81, which transfers a data request signal to host 10 indicating that host 10 should begin transferring pixel data for a new scan line to control circuit 14. Additionally, the SL signal allows a pixel clock (PC) signal from pixel clock 74 to pass through AND gate 76. This results in the output clock (OC) signal which clocks the stored digital pixel data corresponding to one of the scan lines out of one of the line buffers (e.g. buffer 82). The digital pixel data passes through OR gates 86 and is converted to analog signals in digital-to-analog (D/A) converters 88. The analog signals are transferred to laser diode drivers 90 which, in turn, drive laser diodes 16, 18 and 20 causing the outputs of laser diodes 16, 18 or 20 to be modulated in a manner corresponding to the analog signals from D/A converters 88. In this way, the beams of radiation 22, 24 and 26 generated by laser diodes 16, 18, and 20 are modulated by the digital pixel data previously transferred to first line buffer 82 by host device 10.

When the SL signal returns to a low state, it allows blank pulse generator 70 to be enabled by subsequent SOS signals from SOS detector 42. Therefore, with the next subsequent N-1 signals from SOS detector 42, laser diode drivers 90 are clamped off, resulting in laser diodes 16, 18 or 20 emitting no radiation. Care must be taken to turn off laser diodes 16, 18 and 20 only when reflected beam 30' is scanned across medium 32 so that enough radiation from laser diodes 16, 18 and 20 is available when reflected beam 30' passes SOS detector 42 to produce an SOS signal pulse. Also, when the SL signal is low, the output clock (OC) signal is held low (i.e. turned off) so no digital information is transferred to D/A converters 88.

During the N-facet period starting with the scanning of the line modulated by the pixel data from buffer 82, the next line of data is being transferred from host device 10 into the other buffer 84.

As indicated in the above discussion, the rate at which data is written into buffers 82 and 84 is approximately N facet periods, while the rate at which data is read from buffers 82 and 84 is one (1) facet period. Therefore, the amount of time which host device 10 is allowed to transfer digital data is increased while the instantaneous scan velocity (the rate at which beam 30' is scanned across photosensitive medium 32) remains the same.

Figure 4A:
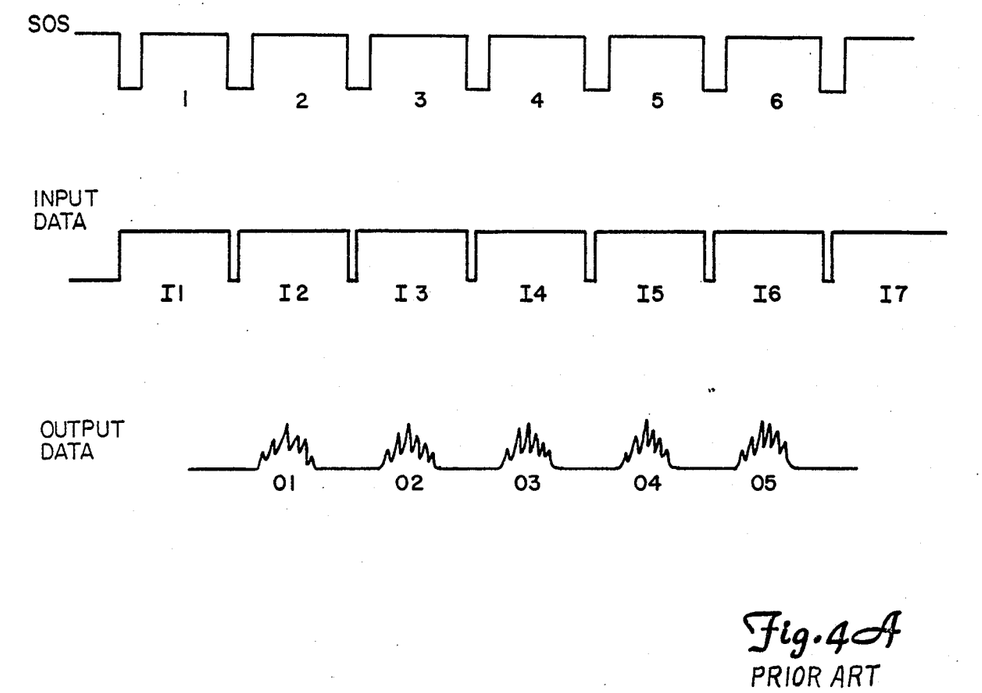
FIG. 4A and 4B show timing diagrams which compare the prior art scanner operation with the present invention.
Figure 4B:
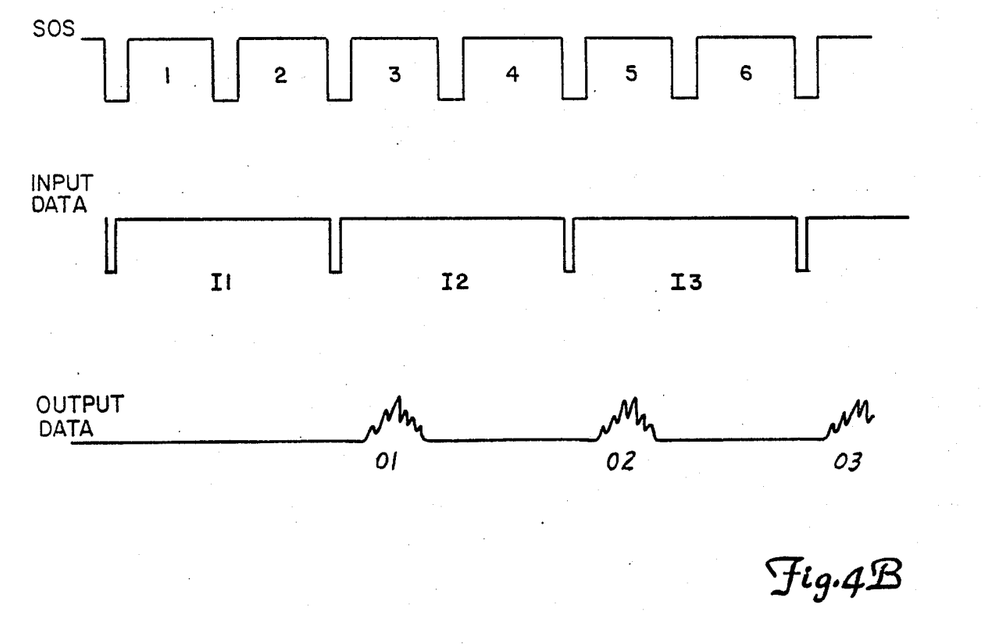

FIGS. 4A and 4B show two sets of timing diagrams. The first set shown in FIG. 4A illustrates the timing diagram of prior art systems where no facets on rotating mirror 50 are skipped (i.e. N=1). The SOS signal is pulsed each time a facet of rotating mirror 50 rotates past SOS detector 42. Where no facets are skipped, one line of the pixel input data must be transferred from host device 10 to laser printer 12 during each period of the SOS signal, since one scan line is produced during each period of the SOS signal.

Where every other facet on rotating mirror 50 is skipped (i.e. N=2), as illustrated in FIG. 4B, the SOS signal still pulses each time a facet of rotating mirror 50 causes beam 30' to impinge on SOS detector 42. However, the input pixel data for each scan line may be transferred from host device 10 for a period of time corresponding to two SOS periods. The output data, however, is still supplied to modulate laser diodes 16, 18 and 20 within one period of the SOS signal. FIG. 4B shows that where N=2, the period in which host device 10 may transfer digital data is increased by a factor of two, while the instantaneous scan velocity, i.e. the velocity at which reflected beam 30' is scanned across photosensitive medium 32) remains the same as in FIG. 4A.

Figure 5:
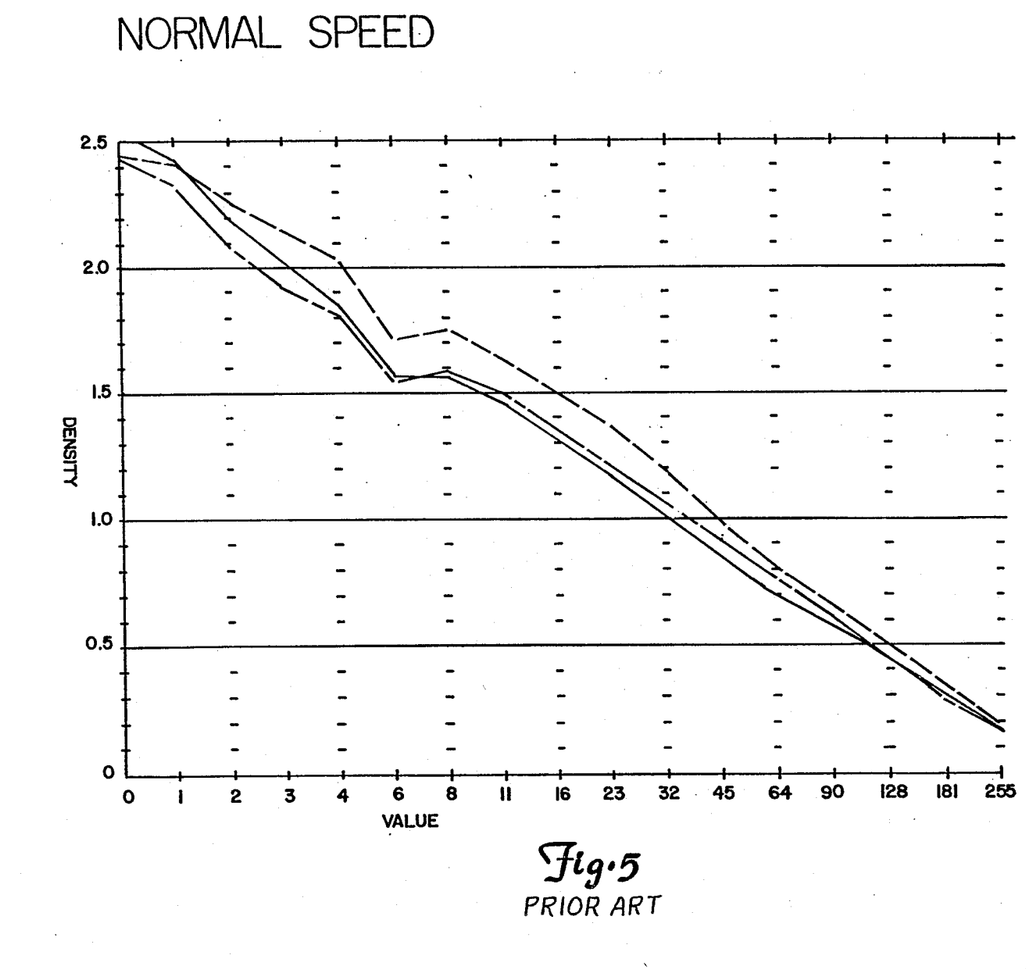
FIG. 5 a graph of measured DlogE curves from test exposures ski no facets, as in the prior art, FIG. 6 a graph of measured DlogE curves from test exposures skipping three of every four facets, as taught by the present invention.
Figure 6:
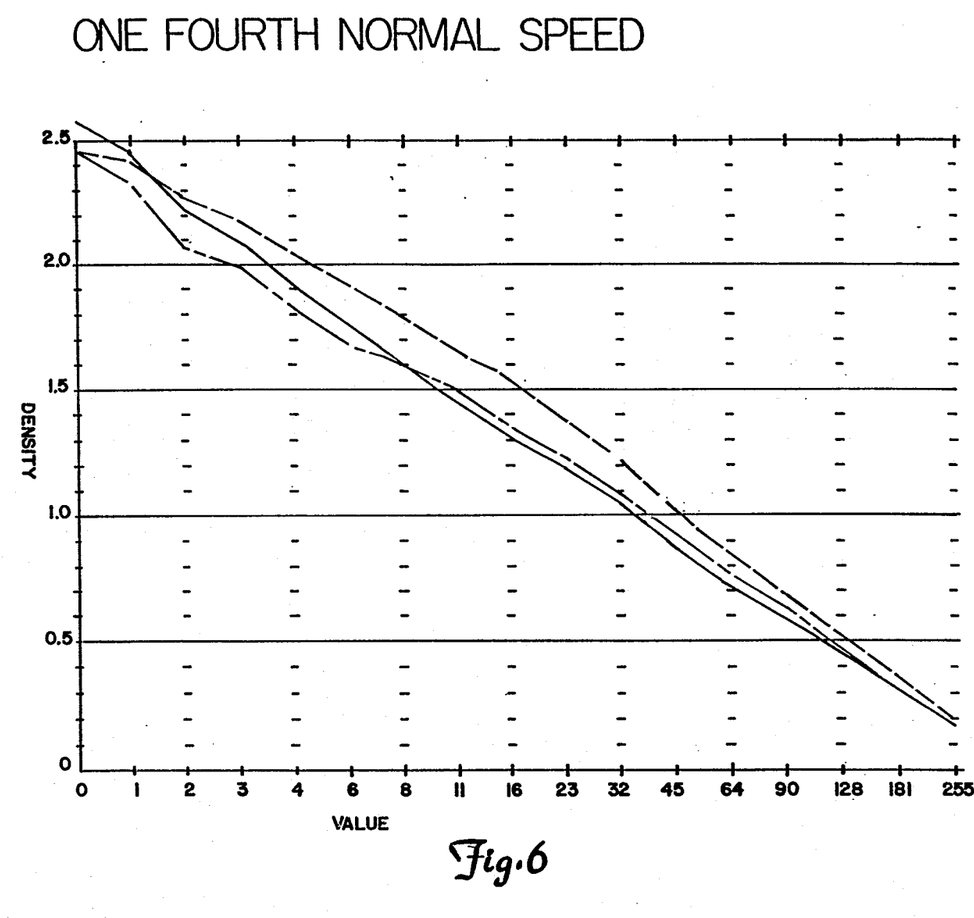

The performance of the present invention with respect to optical imaging can be seen by looking at FIGS. 5 and 6. FIG. 5 shows density versus log exposure (D-log E) curves of a laser printer which is printing at the normal speed (i.e. where no facets of rotating mirror 50 are skipped) and where the input data is buffered utilizing a large, full image buffered memory. In other words, FIG. 5 shows the D-log E curves of a laser printer operating in accordance with methods which were used in the prior art.

FIG. 6 shows the D-log E curves of the laser printer using the present invention. The laser printer which corresponded to the D-log E curve of FIG. 6 used N=4, and therefore printed at one-fourth the normal transport speed (one scan line was generated for every four facets on rotating mirror 50). This lower average data rate of recording allowed data to be transferred from host device 10 a line at a time without the need for a large, full image buffer memory. can be seen, there is a very close relationship with respect to the D-log E curves of the three colors, yellow, cyan, and magenta, in FIGS. 5 and 6. Comparing FIGS. 5 and 6, it is apparent that the performance of the present invention does not vary significantly from that of the prior art printers, despite a reduction of the average data rate of recording by a factor of four. This is because the instantaneous scan velocity is unchanged--only the period between scanning of adjacent lines has been increased to accomodate the lower data rate of the host device.

This invention in the time between consecutive scan lines. Therefore, if the density which is built up on medium 32 is based on the accumulation of successive scan lines (due to a certain degree of overlap in the beam profile at the imaging plane) then medium 32 must be such that increasing the time between successive scan lines does not affect this accumulation of energy. For example, the exposure resulting from two partially overlapping scan lines from successive facets must affect medium 32 in the same way as the exposure resulting from two partially overlapping scan lines with an unused facet time period in between.

Although the present invention has been described for a three-channel color laser imager, the concept is directly applicable to any polygon based laser scanner. This invention allows the speed at which a laser printer requires input digital data, which represents the image to be printed, to be compatible with the speed at which a host device can transfer that digital data to the laser printer. The invention accomplishes this without using a large buffer memory. Therefore, the drawbacks associated with a large buffer memory--such as cost, complexity, and duplication of resources--are avoided. Additionally, the invention retains the time required to expose one line of the photosensitive medium to the laser (i.e. the instantaneous scan velocity). This is because the instantaneous scan velocity, which is controlled by the angular velocity of the rotating mirror, remains unchanged. The pixel dwell time and the energy distribution on the photosensitive medium, therefore, remain the same. By increasing the time between successive scan lines by a factor of N, the average data rate of the laser printer is reduced to be compatible with the data rate of the host device.

Although the present invention has been described with reference to preferred embodiments, workers skilled in the art will recognize that changes may be made in form and detail without departing from the spirit and scope of the invention.

What is claimed is:

1. Apparatus for recording an image on a medium as a function of digital pixel data, the apparatus comprising:

first and second buffer means for receiving and accumulating pixel data at a first rate and for supplying the pixel data to the means for modulating at a second higher rate; and select means for alternately selecting one of the first and second buffer means to receive and accumulate pixel data for one scan line and the other of the first and second buffer means to supply pixel data for another scan line to the means for modulating;

means for scanning a radiation beam across the medium in a first direction using non-successive facets of a multifaceted rotating mirror; and means for modulating the beam as a function of the pixel data accumulated to record the scan line on the medium.

2. Apparatus for recording an image on a medium as a function of digital pixel data, the apparatus comprising:

means for accumulating pixel data for a scan line;
   means for producing a radiation beam;
   means for directing the beam along a path;
   a multifaceted mirror positioned in the path, each facet of the mirror being capable of producing one scan of the beam across the medium as the facet moves through the path;
   means for rotating the mirror;
   means for inhibiting the beam while selected facets of the mirror move through the path so that non-successive facets of the mirror cause scanning of the beam; and
   means for modulating the beam as a function of the pixel data accumulated to record the scan line on the medium.

3. The apparatus of claim 2 wherein the means for scanning further comprises:

means for providing a start-of-scan signal which indicates when each facet of the mirror reaches a position to scan the beam across the medium; and wherein the means for inhibiting is responsive to the start-of-scan signal.

4. The apparatus of claim 3 wherein the means for inhibiting comprises:

counter means responsive to the start-of-scan signal for counting facets of the mirror;

means for providing a signal to the modulating means which causes the beam to be maintained at an intensity which will not cause recording on the medium during N−1 facets, where N is an integer greater than one; and means for enabling the means for modulating each time an Nth facet is counted by the counter means.

5. Apparatus for recording an image on a medium as a function of digital data received at an input data rate, the apparatus comprising:

beam producing means for producing a beam capable of recording pixels of the image on the medium;

transport means for advancing the medium in a longitudinal direction at a controlled rate;

scanning means for scanning the beam across the medium in a transverse direction generally perpendicular to the longitudinal direction, the scanning means including a multifaceted rotating mirror in a path of the beam, movement of each facet of the mirror being capable of producing one scan of the beam across the medium at a scan velocity proportional to angular velocity of the rotating mirror;

modulating means for modulating intensity of the the beam as a function of the digital data on a pixel-by-pixel basis as the beam is being scanned across the medium by the scanning means; and inhibit means for selectively inhibiting the beam so that the beam is scanned by only one of every N facets of the mirror to produce an average data of recording of the image which is compatible with the input data rate, wherein N is an integer greater than one.

6. The apparatus of claim 5 wherein the means for controlling intensity further comprises:

means for producing a start-of-scan signal when each facet of the multifaceted rotating mirror has rotated to a point where it is capable of producing a scan of the beam across the medium; and wherein the inhibit means is responsive to the start-of-scan signal for synchronizing the scanning means with the modulating means so that the intensity of the beam is being modulated as a function of the digital data only when the beam is being scanned across the medium.

7. The apparatus of claim 6 and further comprising:

means for providing an N input value, which represents a number of facets for which only one scan will occur, to the inhibit means and to the transport means for controlling the controlled rate at which the medium is advanced in the longitudinal direction.

8. The apparatus of claim 6 wherein the means for controlling intensity further comprises:

divide-by-N counter means for providing an output to the inhibit means each time N start-of-scan signals have been produced.

9. In a laser printer of a type in which a laser beam is scanned across a medium using a rotating multifaceted mirror and in which intensity of the laser beam is modulated at a first data rate as a function of digital data, the digital data being received by the laser printer at second, lower data rate; an improvement comprising:

means for accumulating the digital data received at the second rate representing a scan line, and supplying the digital data accumulated at the first rate;

means for modulating the laser beam as a function of the digital data supplied by the means for accumulating during each scan of the beam across the medium; and means for inhibiting the laser beam so that only selected non-successive facets of the mirror cause scanning of the laser beam, thereby producing an average data rate of recording on the medium which is compatible with the second data rate.

* * * * *